(12) United States Patent
McLachlan et al.

(10) Patent No.: US 9,268,677 B2
(45) Date of Patent: Feb. 23, 2016

(54) DYNAMIC OBFUSCATION OF HEAP MEMORY ALLOCATIONS

(71) Applicant: Apple Inc., Cupertino, CA (US)

(72) Inventors: Jonathan G. McLachlan, San Francisco, CA (US); Julien Lerouge, San Jose, CA (US); Daniel F. Reynaud, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 351 days.

(21) Appl. No.: 13/659,878

(22) Filed: Oct. 24, 2012

(65) Prior Publication Data

US 2014/0115292 A1    Apr. 24, 2014

(51) Int. Cl.
*G06F 12/00* (2006.01)
*G06F 12/02* (2006.01)
*G06F 9/50* (2006.01)

(52) U.S. Cl.
CPC . *G06F 12/02* (2013.01); *G06F 9/50* (2013.01)

(58) Field of Classification Search
CPC ............................... G06F 12/14; G06F 12/416
USPC .................................................. 711/154, 163
See application file for complete search history.

(56) References Cited

U.S. PATENT DOCUMENTS

| 2009/0153897 A1* | 6/2009 | Blackmore et al. ........... 358/1.15 |
| 2011/0258516 A1* | 10/2011 | Salmon-Legagneur et al. ............................. 714/768 |
| 2012/0159194 A1 | 6/2012 | Anderson |
| 2013/0145177 A1* | 6/2013 | Cordella et al. ............... 713/193 |

FOREIGN PATENT DOCUMENTS

GB          2367164 A      3/2002

OTHER PUBLICATIONS

Novark, Gene and Berger, Emery, "DieHarder: Securing the Heap", Oct. 4, 2010-Oct. 8, 2010, pp. 573-584, Engineering Village/ACM, Chicago, Illinois, USA.

* cited by examiner

*Primary Examiner* — Gurtej Bansal
(74) *Attorney, Agent, or Firm* — Blakely, Sokoloff, Taylor & Zafman LLP (57) ABSTRACT

Techniques, methods, systems, and computer-readable media for allocating and managing dynamically obfuscated heap memory allocations are described. In one embodiment a memory manager in a data processing system contains an addressor, to determine a first address of a program object in a first memory address space, and one or more encoders, to abstract memory access to the program object using the first address such that layout of the object data in the first address space differs from the layout of the object in a second address space. In one embodiment, a runtime system modifies object code of an executable file to include encoder routines to abstract memory accesses to data in an obfuscated heap. In one embodiment, a compiler system using an intermediate representation of a high level program generates an intermediate representation of a high level program capable of performing memory writes and memory reads using obfuscation encoder routines.

27 Claims, 12 Drawing Sheets

DYNAMIC OBFUSCATION OF HEAP MEMORY ALLOCATIONS

BACKGROUND OF THE DISCLOSURE

Any application that accepts input from a user, from a file, or from the network has to store that input, at least temporarily. Except in special cases, most application memory is stored in one of two places, the stack or the heap. Generally, the stack is a part of an application's address space devoted to storing data specific to a particular instance of a construct, such as, for example, function local variables that are valid for a single function call. The heap, however, is more general-purpose storage for an application. Memory dynamically allocated by a software program generally will be allocated within the program's heap. Data stored in heap allocated memory persists for the duration of the program, or until the program de-allocates the memory. Controlling the visibility of heap memory allocations creates a special kind of access control problem. Without some additional security, sensitive data stored in runtime heap allocations could become vulnerable to unwanted access by reverse engineers.

Reverse engineering is one process by which secure or protected aspects of data, software or hardware products can be uncovered through the analysis of the operation of the products. A reverse engineer can attack a product from several paths, one of which is the analysis of the product's data flow. By analyzing a product's data flow, protected information, such as an encryption key, can be uncovered from software that is intended to be secure. Protecting the logical structure of data in the memory of a running program can be particularly challenging because the program has to be able to make use of the data during the execution of the program. Any method or mechanism used to protect the data can also interfere with the speed or efficiency of the program flow.

One manner of protecting a program against data flow analysis is to use data obfuscation to make the reverse engineering of program data structures more difficult. Data obfuscation is a technique in which data stored in memory is scrambled, encrypted or rearranged in a manner that makes it difficult for an external user or program to make use of protected data should it be accessed by unauthorized parties. However, any manner of data obfuscation may impose overhead in a program that causes it to consumer extra resources or may slow program execution.

SUMMARY OF THE DESCRIPTION

The embodiments described relate to techniques, methods, systems, and computer-readable media for allocating and managing dynamically obfuscated heap memory allocations. In one embodiment a memory manager in a data processing system contains an addressor, to determine a first address of a program object in a first memory address space, and one or more encoders, to abstract memory access to the program object using the first address. In one embodiment, the abstracted memory accesses operate to configure the layout of the object data in the first address space differently from the layout of the object in a second address space, such that data objects are obfuscated when stored into system memory. In one embodiment, a runtime system can modify the object code of an executable file to include encoder routines to abstract memory access to data in an obfuscated heap. In one embodiment, a compiler system can generate an intermediate representation of a high level program, which is capable of performing memory writes and memory reads using obfuscation encoder routines.

The various embodiments herein described can be implemented in numerous ways, including as a method, system, device, and computer readable medium. The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Various memory access methods that protect against data flow analysis will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention.

The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both.

Figure 1:
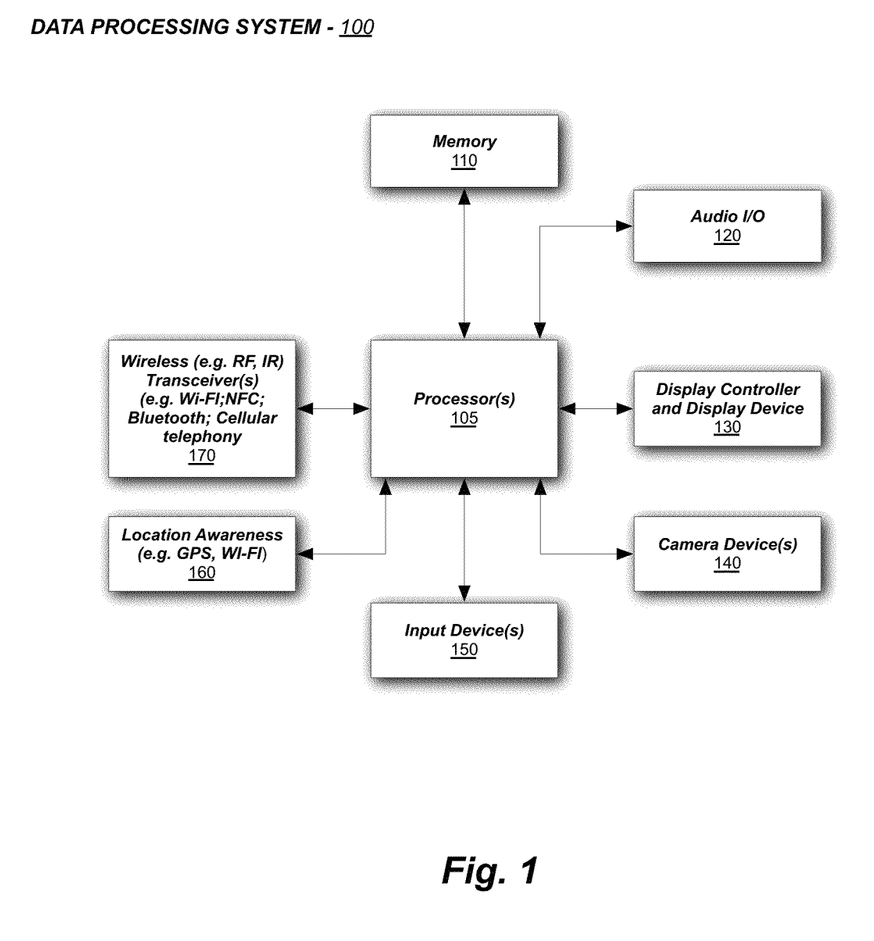
FIG. 1 is a block diagram of one embodiment of a data processing system that utilizes stack obfuscation according to one embodiment of the invention.

FIG. 1 is a block diagram of one embodiment of a mobile data processing system capable of implementing dynamic heap obfuscation. The data processing system 100 includes a processing system 105 with one or more microprocessors. The system 100 also includes memory 110 for storing data and programs for execution by the processing system. The system 100 additionally includes an audio input/output subsystem 120 which may include a microphone and a speaker for playing back music or providing telephone functionality through the speaker and microphone.

A display controller and display device 130 can be used to provide a graphical user interface for the user, such as the graphics user interface provided by iOS devices such as the iPhone, iPad and iPod touch. Additionally, the display and audio functionality can be coupled to provide video playback, or video communication services. A wireless transceiver 170 can transmit and receive data via one or more wireless technologies such as Near Field Communication (NFC), Wi-Fi, infrared, Bluetooth, or one or more variants of wireless cellular technology. One embodiment of system 100 contains one or more camera devices 140 configured in both a front and rear facing configuration, though similarly configured systems each with a front facing camera, or no camera, can be one of many optimal configurations. The data processing system 100 can also include one or more input devices 150 that allow a user to provide input to the system. Input devices can include a keypad or keyboard, alone or in conjunction with a voice recognition system, or a touch or multi touch panel that is overlaid on the display device 130. Additionally, embodiments of the data processing system 100 can also include a device for providing location awareness services, such as a Global Positioning System (GPS) device 160 or its equivalent.

It is to be noted that the data processing system 100 as represented in FIG. 1 is by way of example. One or more buses or interfaces, which are not shown, can be used to interconnect the various components, as is well known in the art. As well, additional components, not shown, may also be part of the system 100 in certain embodiments, and in certain embodiments, fewer components than shown in FIG. 1 may also be used.

Figure 2:
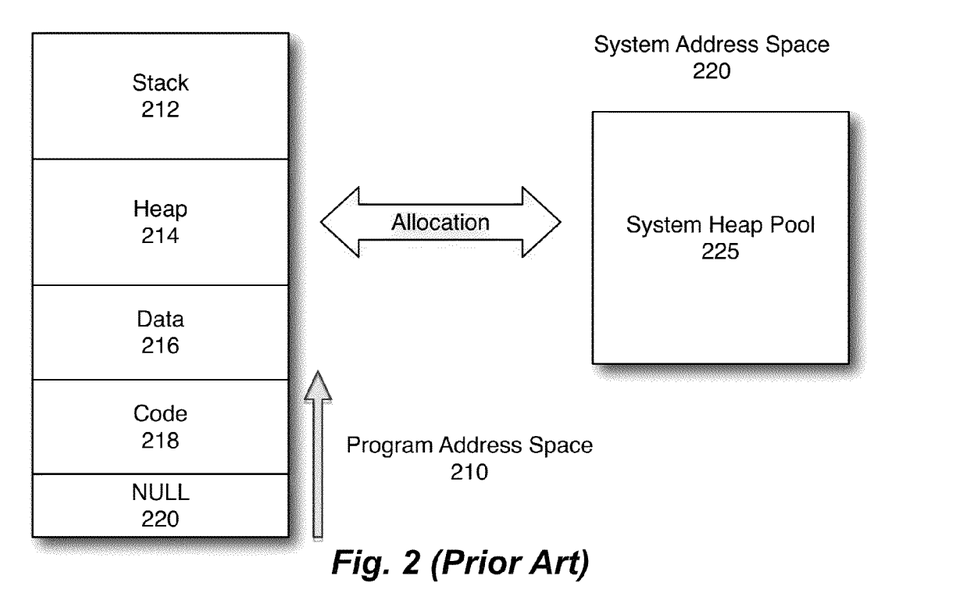
FIG. 2 is a block diagram of an example executable program memory space when the program is a running process in system memory.

FIG. 2 is a block diagram of one example executable program memory space, as is generally known in the art, when the program is a running process in system memory. The executable program can contain compiled program code and data that is stored in one or more files of the nonvolatile storage of a data processing system, such as, for example, the data processing system 100 of FIG. 1. To execute the program, the program's binary code is typically loaded into the system's volatile memory at a certain address. In one embodiment of the data processing system, an executable file has sections of data and code split into segments, which contain different types of data for use during the program's execution. For example, a Null 220 segment occupies the first page of an executable program's memory space at a program's virtual memory address zero and cannot be read or written to by the executable program. Accordingly, attempts to access a Null memory address, a common programming error, results in an immediate program crash, rather than a corruption of the next segment, the Code 218 segment, which contains the executable code of the program, and can also contain data declared to be constant. The Data 216 segment is both readable and writable, and contains global program data and static variables that have been initialized by the programmer. The size of the Data 216 segment is determined by the amount of global or static information used by the programmer during the application's development, and generally will not change when the application is a running process in memory.

The Heap 214 and Stack 212 segments are available to an executable program when it is loaded into volatile memory for execution. In conventional data processing systems, the Stack 212 is statically allocated, while the Heap 214 contains dynamically allocated memory. The relative placement of the Heap 214 and the Stack 212 can vary based on processor architecture, but it is common to have the segments grow towards each other. In this example, Program Address Space 210 grows linearly upward, starting from the bottom of the Null 220 segment, to the stop of the Stack 212 segment. However, different systems or processor architectures can vary, and embodiments of the invention are not limited in such a manner.

In this example, the Heap Base Address 215 begins at some point above the virtual memory address where the data segment is loaded into memory, and the Stack Base Address 211 begins at or near the top of the program's virtual memory space. In some operating systems, the top of a program's virtual memory space is mapped into the operating system's kernel, which reduces the available address space for the programs to use. As the stack and heap grow through usage, the address space available to each is reduced. In conventional dynamically allocated memory systems, when a process dynamically allocates memory in the process heap space, memory is allocated from a System Heap Pool 225, and a pointer is returned to the processes for the memory allocation. When the process is finished using the allocation, or during some form of garbage collection after process termination, the block of memory is released by be used by other processes. Generally, some block of at least n bytes on the System Heap Pool 225 is allocated, and is mapped to process virtual memory.

Figure 3:
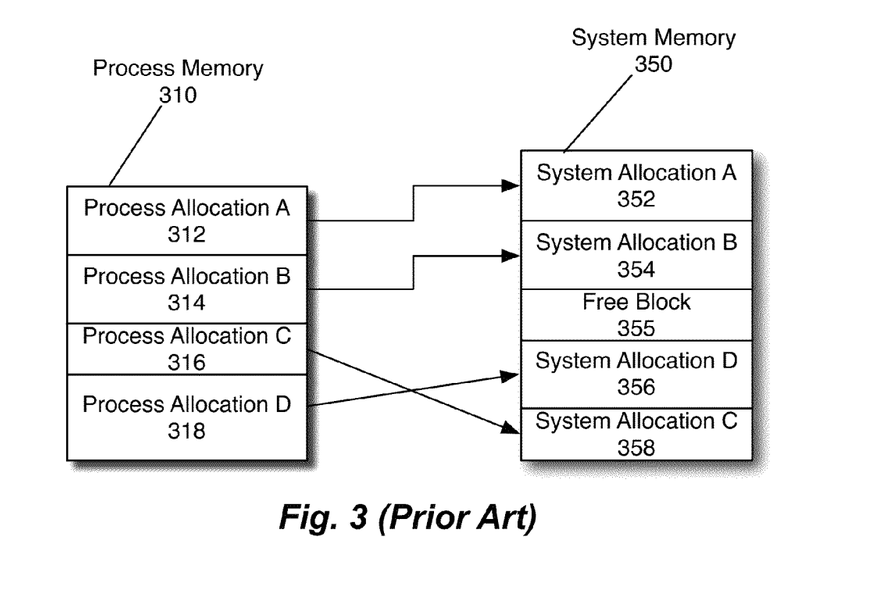
FIG. 3 is a block diagram illustrating an example memory mapping from process virtual memory addresses to system physical memory addresses.

FIG. 3 is a block diagram illustrating an example memory mapping from process virtual memory addresses to system physical memory addresses. Using virtual memory, a process can appear to access memory in a linear fashion, hiding the potentially fragmented nature of the underlying physical memory. Generally, even though the base address of a given block of virtual memory can be arbitrarily located, the memory addresses are arranged linearly. For example, a Process Heap 310 can contain blocks of memory with backing allocations in System Memory 350. The blocks of memory in process memory space can be arranged such that an example Process Allocation A 312 in process virtual memory is backed by a System Allocation A 352 in physical memory, and System Allocation B 354 lies adjacent in physical memory to Process Allocation B 314 in process virtual memory. Alternatively, Process Allocation C 316, which is adjacent to Process Allocation B 316 in process virtual memory, can be mapped to a physical memory offset, such as System Allocation C 358 that has a different arrangement in physical memory than the virtual memory allocation that represents the physical memory addresses of Process Allocation C 316. Likewise for Process Allocation D 318 and System Allocation D 356. If a process were to request an additional allocation, it is possible the Free Block 355 in system memory will be mapped into the allocation if the free block is large enough to service the allocation request.

The dynamic nature of heap allocations, in general, makes them more difficult to use for security exploits compared to statically allocated stack memory allocations, however the memory allocations are still exposed, and storing memory allocations in a way that allows any degree of data flow analysis exposes a program to various security information risks. Information that is stored in heap allocated memory can persist for the duration of the program, which means controlling the visibility of heap memory allocations creates a special kind of access control problem. Without some additional security, sensitive data stored in runtime heap allocations could become vulnerable to unwanted access by malicious programmers, or reverse engineers can expose information that is intended to be secure.

Figure 4:
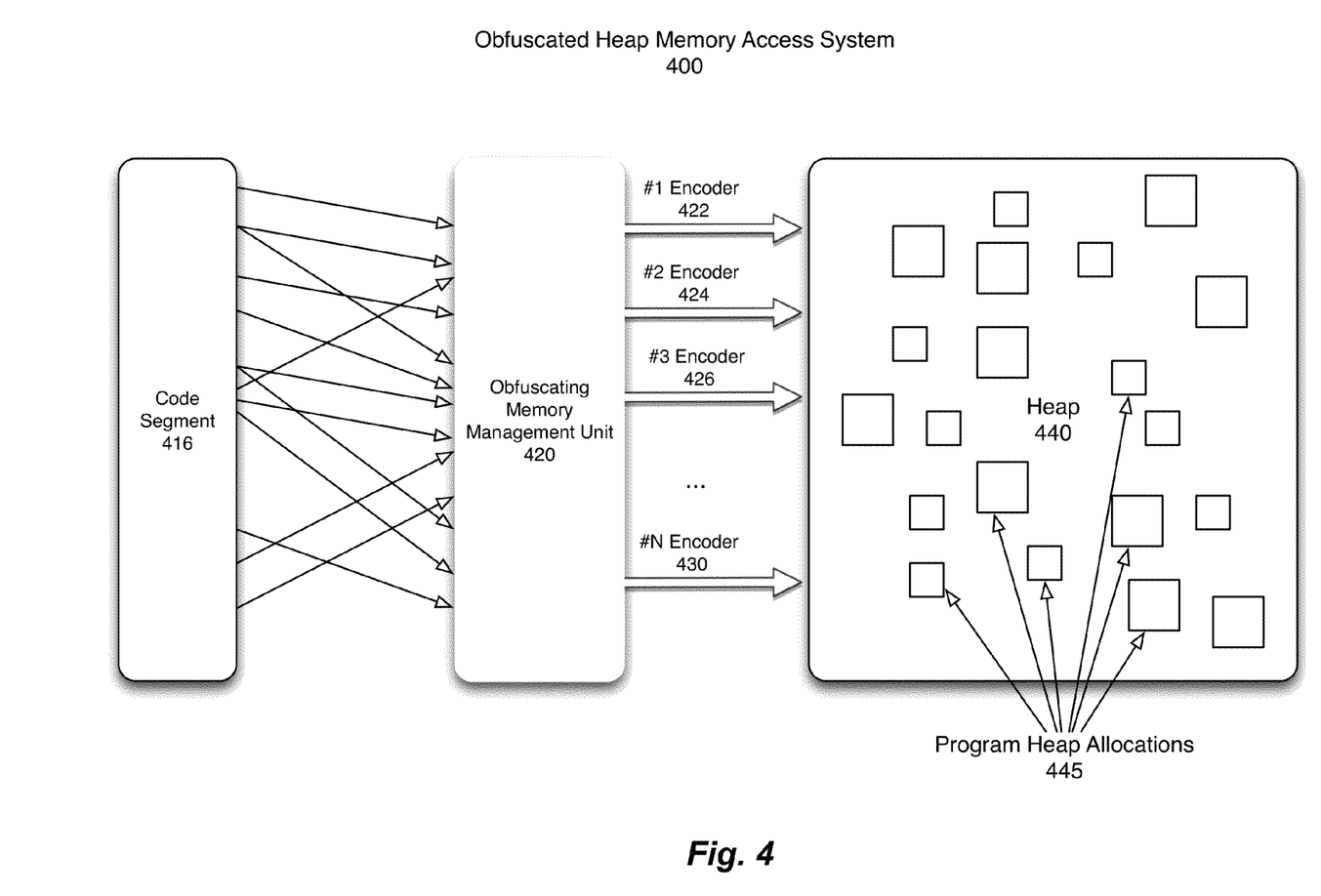
FIG. 4 is a block diagram illustrating one embodiment of a dynamic heap memory obfuscation using a memory management unit.

FIG. 4 is a block diagram illustrating one embodiment of a dynamic heap memory obfuscation that protects program data objects stored in heap memory while minimizing impact to software developers and end users. An Obfuscated Heap Memory Access System 400 can function as an obfuscating abstraction layer that resides between memory access in the Code Segment 416 of a process and the System Heap 440 in system memory. In one embodiment, obfuscation is accomplished by intercepting all direct memory accesses from the code segment of a process and routing the accesses through an Obfuscating Memory Management Unit 420, which breaks the memory accesses into scattered and intertwined components. The obfuscation can be performed in real time by a series of encoders, which are configured to perform one or more obfuscation algorithms during the process memory to system memory translation. In one embodiment, the Obfuscating Memory Management Unit 420 maps process virtual memory addresses to system virtual memory addresses. In one embodiment, the Obfuscating Memory Management Unit 420 can be used to as part of the global system virtual memory to physical memory paging and memory translation system.

In one embodiment, multiple encoders (e.g., #1 Encoder 422 through #N Encoder 430) can be configured to translate multiple memory translation requests in an unrelated fashion, such that each memory allocation is translated in a different manner based on encoder assignment and configuration. This arrangement breaks the relationship between process data and the logical structure of the data's organization in memory, such that the Program Heap Allocations 445 are arranged in a nondeterministic manner in system memory. In one embodiment, a #1 Encoder 422 can be configured to reorder the elements of a fixed range of memory, while a #2 Encoder 424 can be configured to use a complex algorithm to scramble individual bytes of a memory allocation across a range of memory. Additionally, a #3 Encoder can be configured to automatically encrypt data written to memory, while automatically decrypting data during a memory read, such that the memory is encrypted while stored in memory, but the encryption is abstracted from the application's programmer, and any users of the application. Multiple encoders, up to a system limited N number of encoders, can be used by the system.

Figure 5:
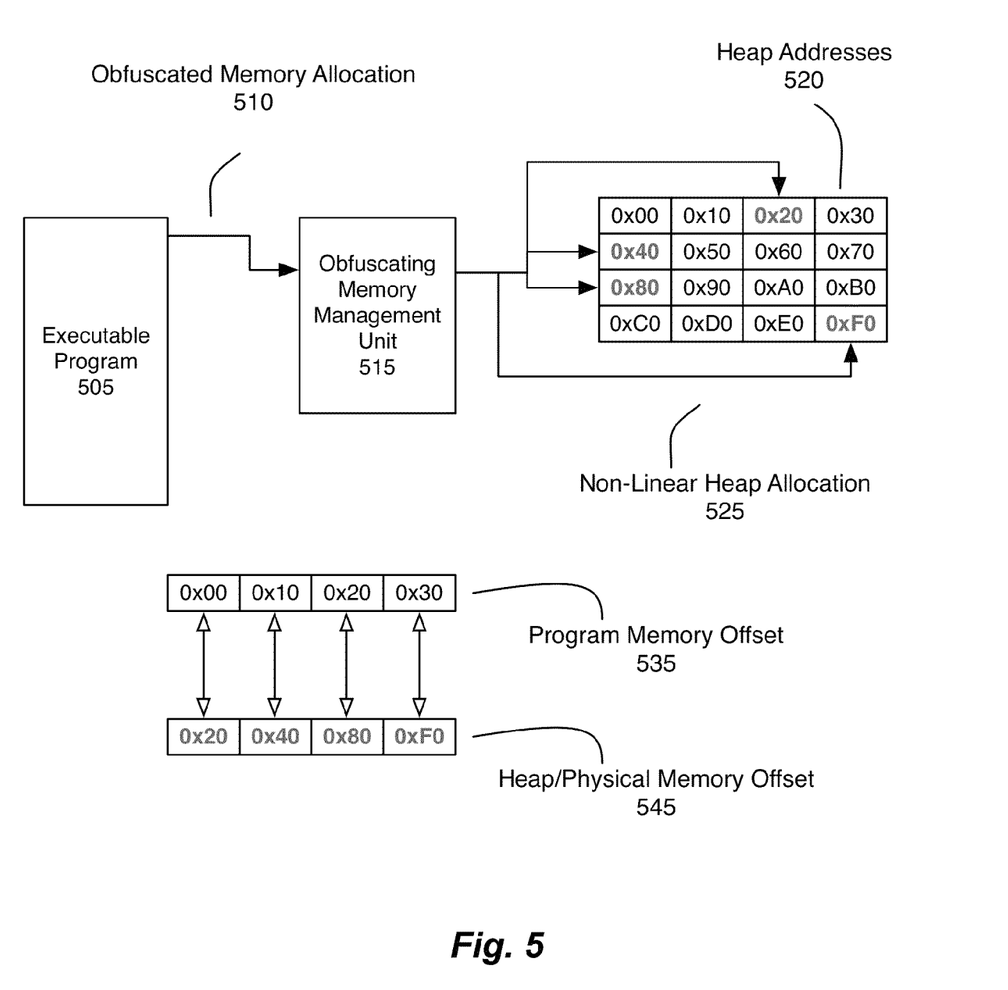
FIG. 5 is a block diagram illustrating one embodiment of obfuscating memory allocations using a non-linear heap allocation.

FIG. 5 is a block diagram illustrating one embodiment of obfuscating memory allocations using a non-linear heap allocation. In one embodiment, an executing program 505 can request an obfuscated memory allocation 510 using a specific memory allocation call. In such embodiment, at program development time, by using specific function calls that request an obfuscated memory allocation, a developer can chose to protect certain memory allocations with address obfuscations while using conventional dynamic memory allocations for other data. Alternatively, obfuscation can be performed at compile time for a specific set of allocations based on one or more compile time options. In one embodiment, such requests for obfuscated allocations are channeled through an obfuscating memory management unit 515 when the executing program 505 accesses the obfuscated allocation. An example non-linear heap allocation 525 is shown where the heap addresses 520 are mapped based on a formula, sequence, or algorithm that distributes the byte allocations based on an encoder determination. In one embodiment, the program memory offset 535 maintains a standard address layout from the perspective of the process memory space, but the system heap or physical memory 545 can be mapped non-linearly.

Figure 6:
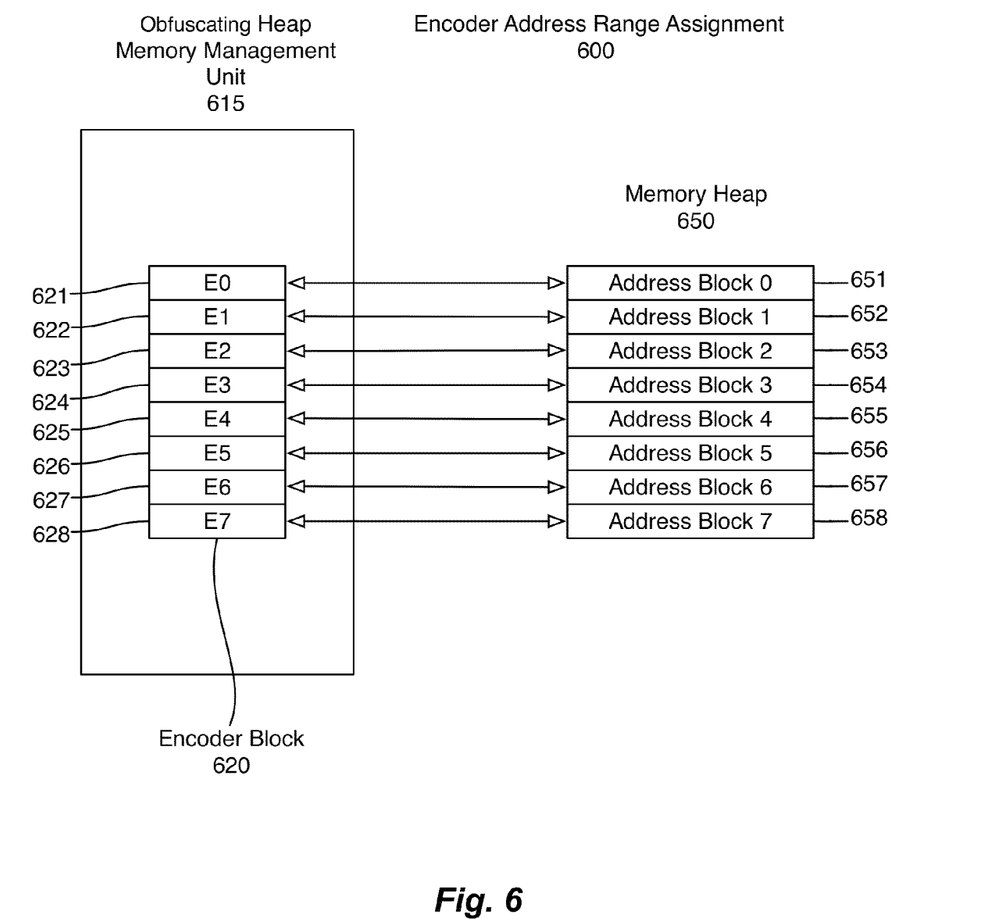
FIG. 6 is a block diagram of an example encoder range to address block assignment according to one embodiment.

FIG. 6 is a block diagram of an example encoder range to address block assignment according to one embodiment of the invention. In one embodiment, an encoder address range assignment system can contain an Obfuscating Heap Memory Management Unit 615 with one or more encoder blocks 620, which can contain one or more encoders (e.g., encoders 621-628). The encoders can each map to one or more address blocks (e.g., 651-658) in a memory heap 650. For example, encoder block E0 621 can map to address block 0 651 such that each programmatic access to address block zero from a runtime process is encoded and decoded by encoder block E0 621. In one embodiment, a runtime encoder is supplemented or replaced by a compile time insertion of encoding routines that can supplement or replace a runtime encoder. In one embodiment, a hardware logic unit dynamically encodes and decodes select memory accesses during routine memory accesses, providing automatic and configurable memory address obfuscation. One or more embodiments feature a tunable security level for each encoder, and each encoder can be tuned separately to provide an increasingly secure encoding for memory accesses, with, in some instances, increased overhead for memory access time, though security level and memory access latency do not necessarily correlate linearly. For example, in one embodiment, encoders E0 621 through E7 628 can be initialized to provide increasingly secure memory encoders with variable overhead costs, and a software developer can select from a plurality of encoder algorithms, or a plurality of encoders known to perform specific encoder logic, depending on whether programmable or fixed-function encoders are in use in a specific embodiment. It will be noted as well, that conventional memory allocations are also supported in at least one embodiment, such that no encoding takes place. This can be accomplished if a developer requests a standard memory allocation through conventional dynamic memory allocation means, or if a programmer elects to use an obfuscated memory allocation system but selects a linear encoding model that results in a conventional memory layout. Alternatively, a compile time selection can be made by the programmer to use standard memory allocations instead of obfuscated memory allocations, just as a programmer can, in one embodiment, elect to compile all memory allocations as obfuscated memory allocations. In one or more hardware-implemented embodiments, a device can be configured through firmware to enable or disable obfuscation on memory access.

Figure 7:
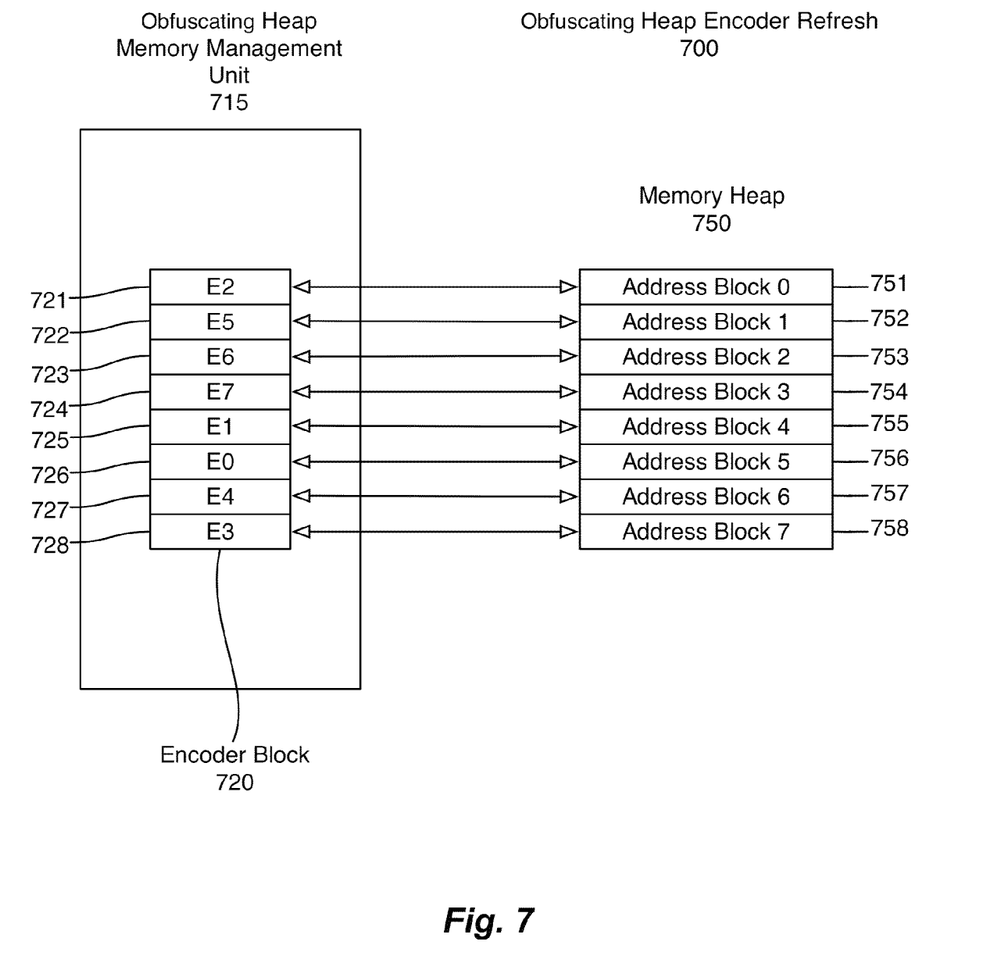
FIG. 7 is a block diagram illustrating an example encoder refresh operation according to one embodiment.

FIG. 7 is a block diagram illustrating an example encoder refresh operation according to one embodiment of the invention. In one embodiment, obfuscated memory allocations can dynamically adjust encoder security strength, or in one embodiment, encoders for specific blocks of memory can be rotated or re-assigned such that a given memory allocation can dynamically switch between encoders during runtime. An example Obfuscating Heap Encoder Refresh System 700 is shown where address block 0 751 through address block 7 758, previously illustrated in FIG. 6, have been allocated in a memory heap 750. One embodiment of an Obfuscating Heap Memory Management Unit 715 is shown in which encoder assignments within the encoder block 720 can rotate or reconfigure such that an encoder such as E1 725, which may have previously been assigned to address block 0 751, as illustrated in FIG. 6, is now assigned to an address block 4 755, such that the encoding algorithm previously used to encode and decode memory addresses for address block 0 751 is now assigned to encode and decode memory addresses for address block 4 755. In one embodiment, each encoder (e.g., encoders E2 721 through E3 728) can change address block assignments during an encoder refresh. A periodic encoder refresh can, under certain circumstances, improve the resiliency of the obfuscation system from reverse engineering attacks by presenting a dynamic obfuscation system that maintains system functionality while increasing the difficulty of acquiring protected data through data flow analysis, or other reverse engineering techniques.

Figure 8:
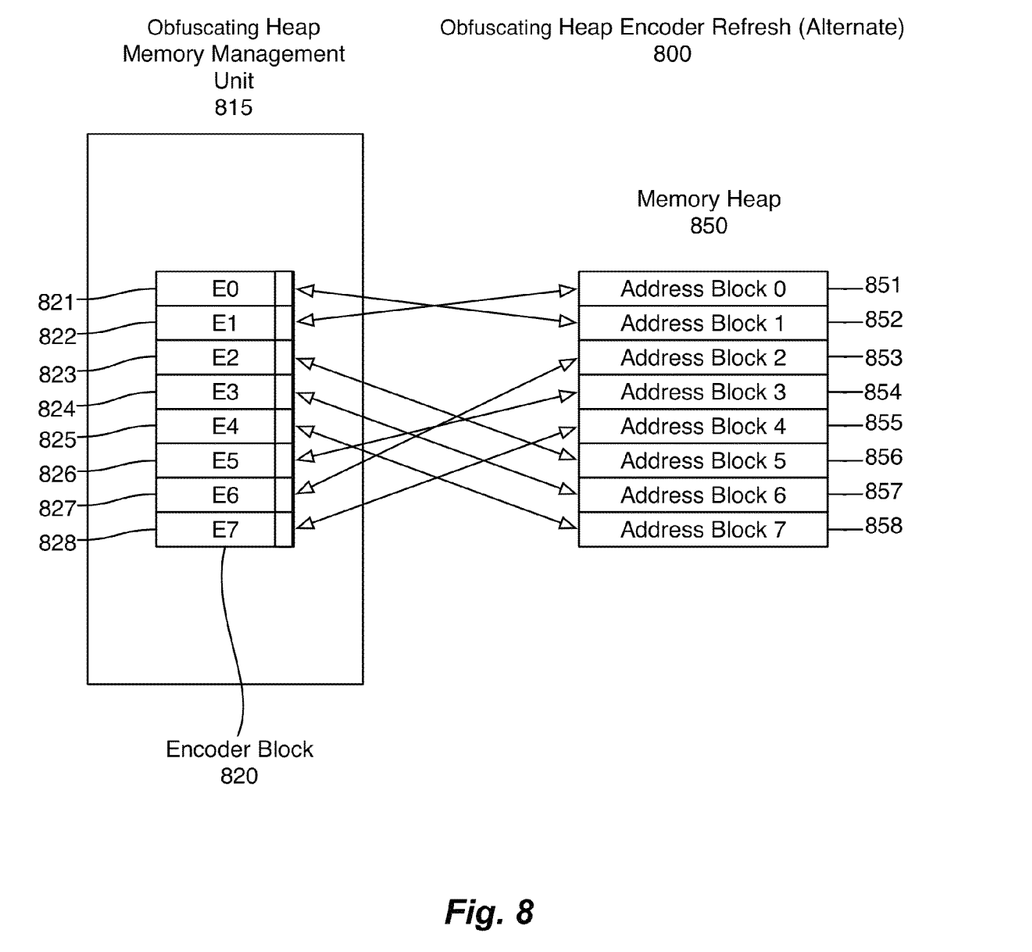
FIG. 8 is a block diagram illustrating an alternate example encoder refresh option according to one embodiment.

FIG. 8 is a block diagram illustrating an alternate example encoder refresh option according to one embodiment of the invention. In one embodiment of an alternate Obfuscating Heap Encoder Refresh System 800, fixed encoders in the encoder block 820 of an Obfuscating Heap Memory Management Unit 815 exchange address block assignments in the memory heap 850. For example, in one hardware implemented embodiment of an Obfuscating Heap Memory Management Unit 815, fixed function logic is encoded in each encoder (e.g., E0 821 through E7 828), and each encoder can accept an assignment of a security parameter and an address range for an address block (e.g., address block 0 851 through address block 7 858) for the encoder to manage. In one embodiment, increasing or decreasing the value of the security parameter, can tune or adjust the logic used to encode or decode various address blocks. Additionally, the address range for each encoder can change such that an encoder can be decoupled from one address range and assigned to a new address range.

Figure 9:
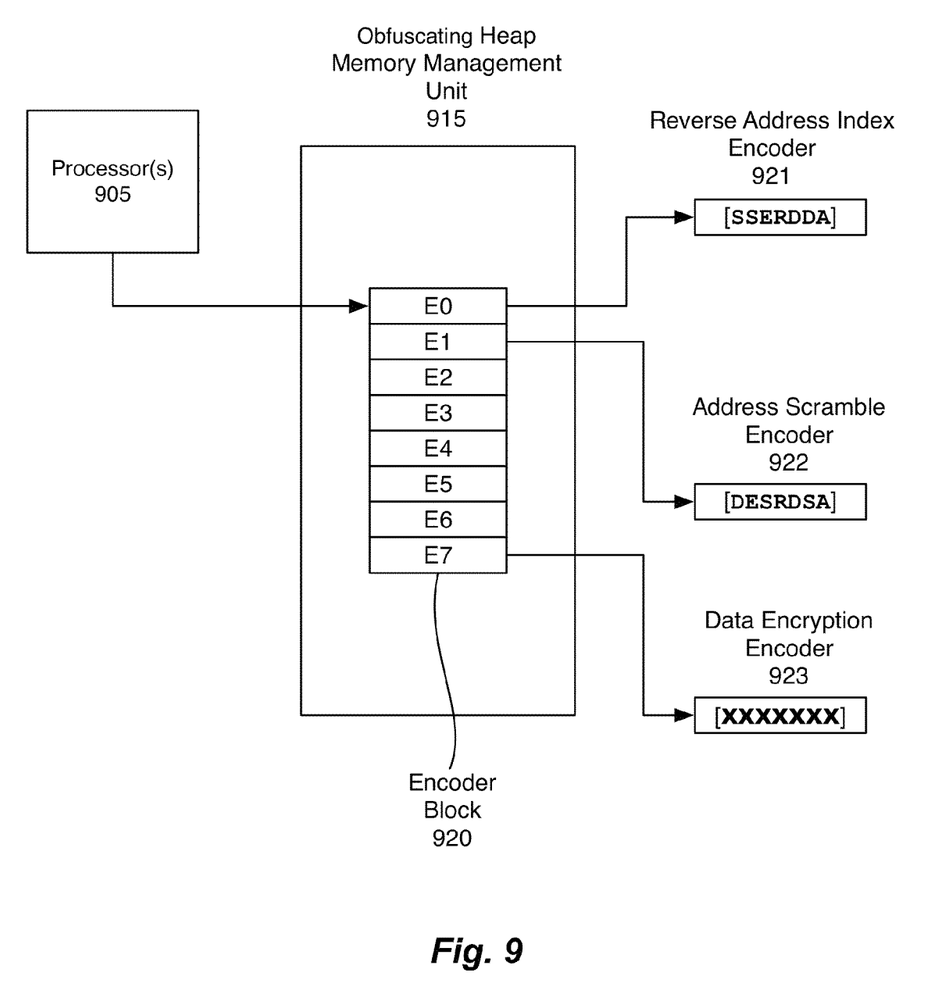
FIG. 9 is a block diagram illustrating one embodiment of runtime obfuscating heap memory management operation according to one embodiment.

FIG. 9 is a block diagram illustrating one embodiment of runtime obfuscating heap memory management operation according to one embodiment of the invention. In one embodiment, a data processing system with one or more processors 905 can access memory through an Obfuscating Heap Memory Management Unit 915, in which processor logical addresses are converted to memory physical addresses according to memory obfuscation logic represented by one or more encoders in an encoder block 920. For example, an encoder E0 in the encoder block 920 can be configured to implement a Reverse Address Index encoder 921 that maps linear addresses in reverse order across a range of physical addresses. In one embodiment of a Reverse Address Index encoder 921, for a specific address range of a specific size, the lowest linear addresses of the allocation corresponds to the highest physical address of an allocation, and as the linear addresses increment, the physical addresses decrement within the memory allocation. In one embodiment, an encoder E2 in the encoder block 920 implements an Address Scrambling Encoder 922 similar to the heap address encoding illustrated in FIG. 5, such that for a given address range, the bytes are referenced non-linearly within the address range, and each sub-block is mapped chaotically within the address range. In one embodiment of the Address Scrambling Encoder 922, a mapping the byte allocations is maintained to enable address decode for a memory read. It will be noted that specific implementations of encoders, or specific implementations of encoder refresh, are not unique to any one implementation or embodiment of the Obfuscating Heap Memory Management Unit (e.g., 615-915 as illustrated in FIG. 6 through FIG. 9) and the invention is not limited as such. In addition to address encoding, in one embodiment, a Data Encryption Encoder 923 is present that can perform real time data encryption and decryption instead of, or in addition to address obfuscation such that the underlying data at the obfuscated address is encrypted during authorized memory writes and decrypted during authorized memory reads.

Figure 10:
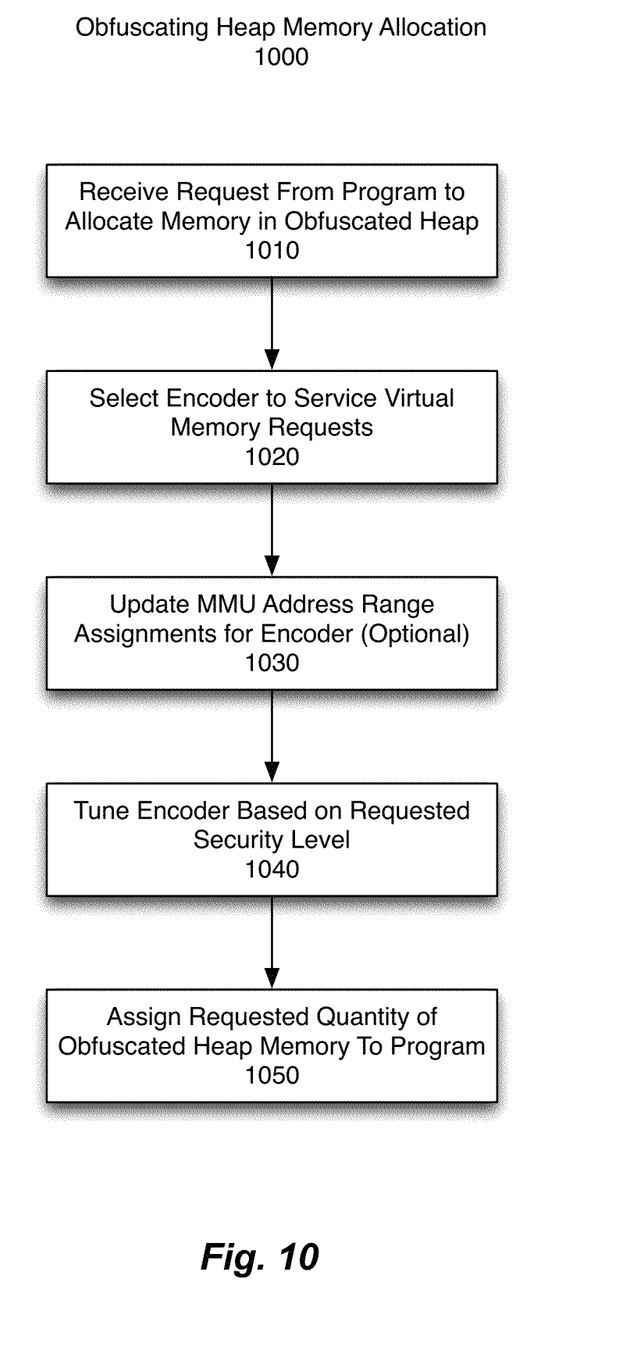
FIG. 10 is a flow diagram of an obfuscating heap memory allocation algorithm according to one embodiment.

FIG. 10 is a flow diagram of an obfuscating heap memory allocation algorithm according to one embodiment of the invention. Although the some processes are described below in terms of sequential operations, it should be appreciated that some of the operations described may be performed in a different order. Moreover, some operations may be performed in parallel rather than sequentially where appropriate.

In one embodiment, a runtime obfuscating heap memory manager can receive a request 1010 from a program to allocate memory in an obfuscated heap. The memory allocation can specify a security parameter to assist the runtime in determining the appropriate encoder, or to assist the runtime in tuning the encoder for the purposes of the program. Using the security parameters, the runtime can perform an operation 1020 to determine, or otherwise select the appropriate encoder to use to map process virtual memory into the system heap. In one embodiment, an encoder can be updated 1030 to incorporate the allocated memory range into the memory range used for an adjacent memory allocation if the updated encoder has the appropriate security configuration for the new allocation. In one embodiment, the encoder is tunable based on input security parameters, and the runtime can perform an operation to tune 1040 the assigned encoder based on one or more security parameters, which are used to determine the encoder security level. In operation 1050, the requested quantity of memory on the obfuscated heap can be assigned to the requesting program for use.

Figure 11:
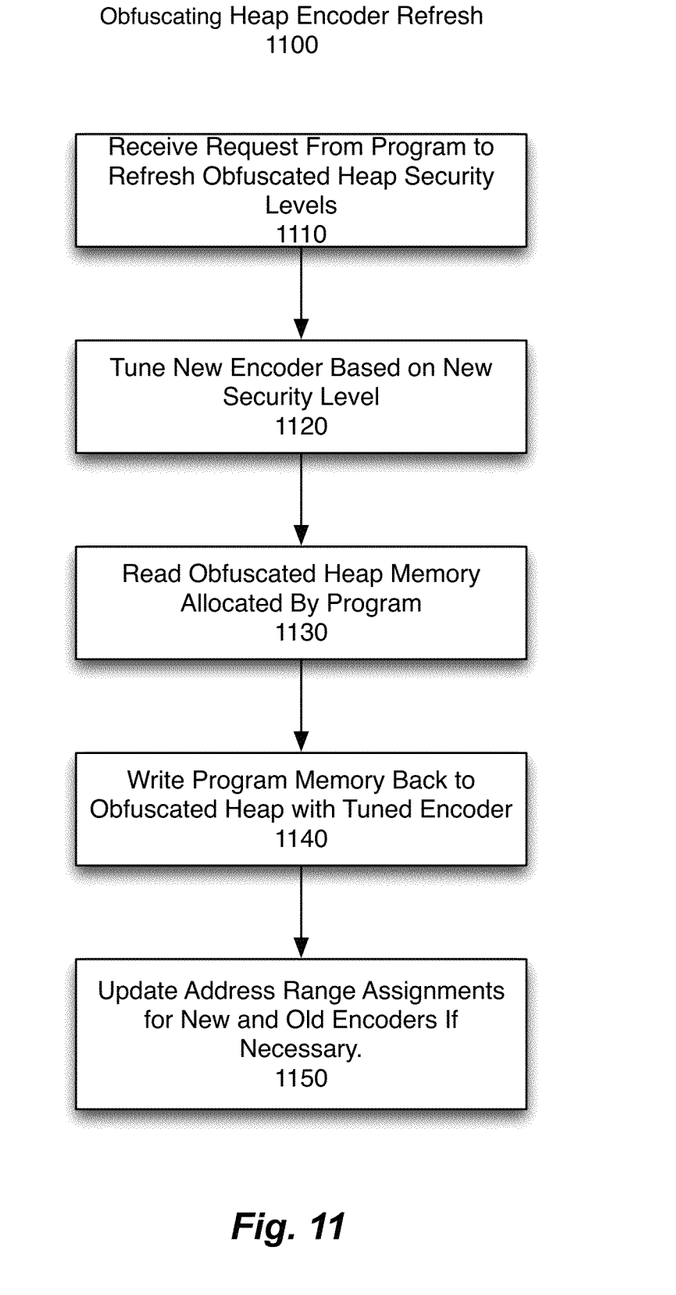
FIG. 11 is a flow diagram of an obfuscating heap memory refresh algorithm according to one embodiment.

FIG. 11 is a flow diagram of an obfuscating heap memory refresh algorithm according to one embodiment of the invention. During one embodiment of an Obfuscating Heap Encoder Refresh 1100 method, the security level or encoder assignment can be changed to present a dynamic data landscape in system memory, and improve the system's resilience to data flow inspection and analysis. A system runtime can receive a request 1110 from a program to refresh obfuscated heap security levels, and, responsive to the request 1110, perform an operation 1120 to tune a new encoder based on the new security level. Alternatively, if the current encoder is tunable, that encoder may be re-tuned to the new security level. However before the current encoder is retuned, or before a new encoder may be assigned, the obfuscated heap memory is read by the encoder in operation 1130. In one embodiment, de-obfuscated memory that is read during a refresh is encrypted during an intermediate write to memory to protect the data from inspection before it is re-written with a re-tuned encoder in operation 1140. In one embodiment, a new encoder is prepared and an optimized read-write sequential operation is performed in operation 1140 that streams data from one address range in the system heap to a different address range in the system heap such that the old encoder operation performs the read operation while the new encoder performs the write operation, with no intermediate storage of de-obfuscated data. If necessary, any needed adjustments for the address ranges can be performed in an operation 1150. For example the old encoder can be re-assigned to cover a new address range for a new allocation, any unused encoders can be power-gated or clock gated in hardware implementations, or encoder address ranges can be optimized or combined. In one embodiment, one or all encoders can be adjusted to accommodate a new security level during refresh.

Figure 12:
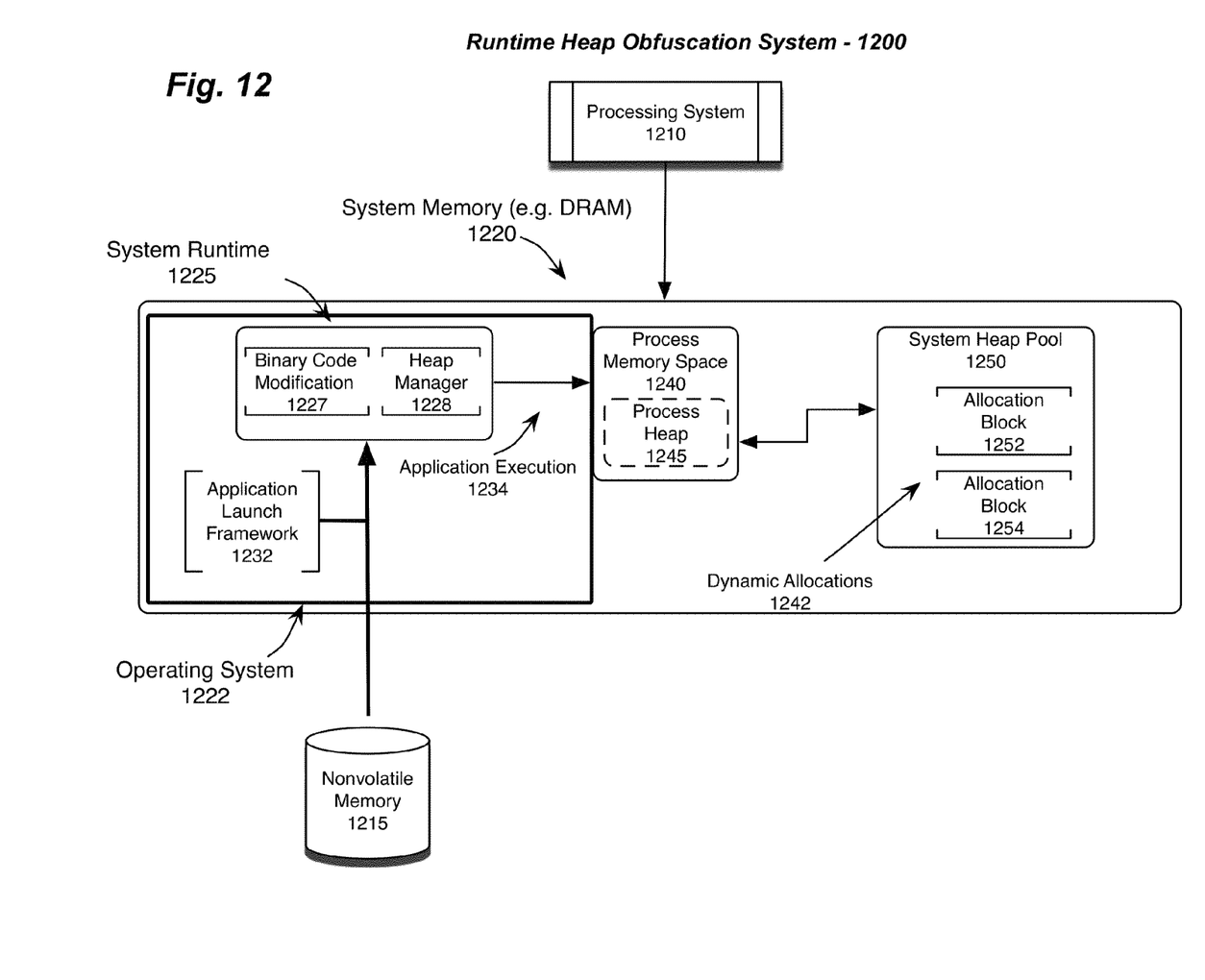
FIG. 12 is a block diagram of one embodiment of system runtime, which performs or facilitates object file modification on an executable file according to one embodiment of the invention.

FIG. 12 is a block diagram of one embodiment of system runtime, which performs or facilitates object file modification on an executable file according to one embodiment of the invention. In one embodiment, a runtime object modification system 1200 can modify executable or object files loaded from nonvolatile memory 1215 and adjust the compiled machine code to insert encoders to facilitate memory access for obfuscated allocations. A data processing system, such as the data processing system 100 of FIG. 1, can contain a processing system 1210 containing one or more processors. The processing system 1210 can direct an operating system 1222 running in system memory 1220 (e.g., DRAM) to perform binary code modification 1227 via a System Runtime 1225. In one embodiment, the operating system 1222 has an Application Launch Framework 1232, which launches applications stored in the nonvolatile memory 1215 of the data processing system. Once an application is loaded into system memory 1220 a System Runtime 1225 can modify the machine code using an binary code modification 1227 module to insert a reference to an encoder routine which can intercept read and write operations to an obfuscated allocation and substitute the appropriate memory address for a given input memory address. In one embodiment, the System Runtime 1225 contains a Heap Manager 1228 module, which services allocation and de-allocation requests, and otherwise maintains the system heap pool and encoder mappings. In one embodiment, a compiler performs binary code modification 1227 at compile time, and generates machine code which can interface with the Heap Manager 1228 to request and manage dynamic memory allocations. In process memory space 1240, a process heap 1245 can store pointers to allocated blocks (e.g., allocation block 1252 and allocation block 1254) in the system heap pool 1250. It is to be noted that the runtime and compile time methods of modifying binary code are not mutually exclusive, and both systems and methods can operate alone, or in combination, on the data processing system. Additionally, such methods can also operate on systems equipped with hardware-implemented embodiments of heap obfuscation.

Figure 13:
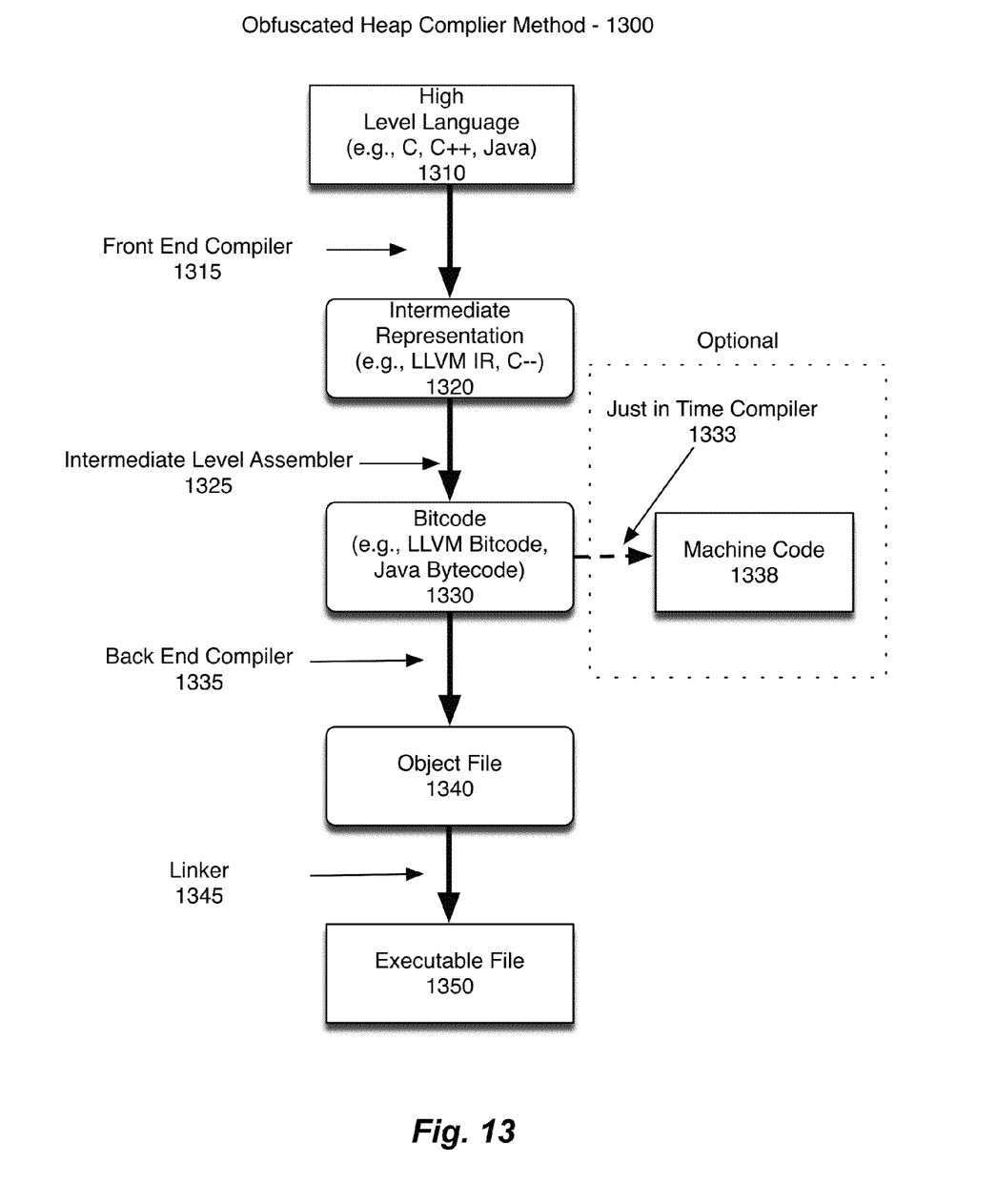
FIG. 13 is a flow diagram of one embodiment of a compiler-implemented method of heap obfuscation for dynamic memory allocations.

FIG. 13 is a flow diagram of one embodiment of a compiler-implemented method of heap obfuscation for dynamic memory allocations. In one embodiment, a program 1310 developed in a high-level language (e.g., C, C++) can be compiled by a compilation system that generates machine code to obfuscate memory accesses to certain dynamic memory allocations stored on an obfuscated heap. A Front End Compiler 1315 specific to the high level language (e.g., GNU C Compiler, Clang, Java, etc.) can be programmed to generate an intermediate representation 1320. In the intermediate representation 1320 (e.g., LLVM IR, C—, etc.), the linear human-readable text that represents a program as developed by a software developer is transformed into an intermediate graph data structure that allows flow analysis and re-arrangements to occur before generating object code containing CPU specific instructions. In one embodiment, instructions for dynamic memory allocation, and subsequent accesses to the allocated memory, can be replaced with references to subroutines that will determine the actual memory address to access, based upon an encoder algorithm, for a given access to memory at a given memory address. This replacement can be based on a specific type of memory allocation command used by a software developer, or can be determined based on input parameters to the compiler or intermediate language generator.

In one embodiment, an intermediate level assembler 1325 can be used to further assemble the intermediate representation 1320 with the heap access modifications into a Bitcode representation 1330, which can be, for example, the LLVM bitcode, which is an encoded form of an intermediate representation of the program, or a representation analogous to the Java Bytecode, which can be executed by a virtual machine. In one embodiment, the Bitcode 1330 representation can be fed to a Just In Time (JIT) compiler 1330 which can directly compile and load the Bitcode 1330 into memory as machine code 1338 for execution, allowing the one or more components of a program to be stored in an intermediate or interpretable format.

In one embodiment, a Back End Compiler 1335 further compiles a Bitcode 1330 representation into an object file 1340, which can be further linked by a linker 1345 into an executable file, to run on a data processing system. The Executable File 1350 can be loaded by, for example, the application launch framework 1232 of the operating system 1222 illustrated in FIG. 12.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. The various aspects, embodiments, implementations, or features of the embodiment can be used separately or in any combination.

The described embodiments can also be embodied as computer readable code on a non-transitory computer readable medium. A non-transitory computer readable medium is any data storage device that can store data which can thereafter be read by a computer system, other than medium designed specifically for propagating transitory signals. Examples of non-transitory computer readable media include floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions. In various embodiments, software-instructions stored on a machine-readable storage medium can be used in combination with hardwired circuitry to implement the present invention. Thus, the techniques are not limited to any specific combination of hardware circuitry and software instructions, or to any particular source for the instructions executed by the data processing system associated with an apparatus for performing one or more of the operations described herein.

What is claimed is:

1. A data processing system comprising:
one or more processors, to execute a program in a system memory;
a memory manager, to allocate and manage dynamically obfuscated heap memory requested by the program, wherein the memory manager comprises:
an addressor, to determine a first address of a data object of the program in a first virtual memory address space; and
one or more encoders, to abstract memory access to the data object of the program using the first address, each of the one or more encoders including an address abstraction unit to translate a first virtual memory address to a second virtual memory address in a second virtual memory address space, wherein the layout of the object data in the first virtual memory address space differs from the layout of the object in the second virtual memory address space.

2. The data processing system as in claim 1, wherein an encoder dynamically adjusts the relationship between the layout of an object in the first address space and the layout of the object in the second address space.

3. The data processing system as in claim 1, wherein an encoder automatically encrypts data during a memory write.

4. The system as in claim 1, wherein the addressor to determine the first address of the data object of the program in the first virtual memory address space based on the address to which the program is loaded into system memory.

5. The data processing system as in claim 1, wherein the relationship between the first virtual memory address space and the second virtual memory address space is nonlinear.

6. The data processing system as in claim 5, wherein the one or more encoders of the memory manager further comprise:
- a data output, to accept a write request to the first memory address and perform a write access to the second memory address; and
- a data input, to accept a read request from the first memory address and perform a read access from the second memory address.

7. The data processing system as in claim 3, wherein an encoder automatically decrypts data during a memory read.

8. The data processing system as in claim 7, further comprising an allocator, to provide a memory allocation in an address range of the first address space from a memory pool in the second address space.

9. The data processing system as in claim 8, wherein the allocator comprises a selectable security level, to select the security level of the memory allocation from a plurality of security levels, the plurality of security levels having varying overhead between security levels.

10. The data processing system as in claim 8, further comprising a de-allocator, to release the memory allocation in the address range of the first address space into the memory pool in the second address space.

11. The data processing system as in claim 10, further comprising a refresher, to change the relationship between an encoder and a range of abstracted memory after the relationship is assigned.

12. A computer implemented method comprising:
- determining a first address of a program data object in a first virtual memory address space;
- encoding the first address of the program data object to determine a second address of the program data object in a second virtual memory address space; and
- accessing the program data object in the second virtual memory address space using the first memory address, wherein the program object data is arranged linearly in the first virtual memory address space and non-linearly in the second virtual memory address space, wherein accessing the program data object comprises accepting a write request to the first virtual memory address, performing a write access to the second virtual memory address, accepting a read request from the first virtual memory address, and performing a read access from the second virtual memory address.

13. The method as in claim 12, wherein the relationship between the layout of the program data object in the first memory address space and the layout of the program data object in the second memory address space is deterministically chaotic, and wherein the second memory address space comprises heap memory for an executable program.

14. The method as in claim 13 further comprising dynamically changing the layout of the data object in the second address space.

15. The method as in claim 14 further comprising automatically encrypting data during a memory write.

16. The method as in claim 15 further comprising automatically decrypting data during a memory read.

17. The method as in claim 16, further comprising creating a memory allocation in an address range of the first address space from a memory pool in the second address space.

18. The method as in claim 17, further comprising selecting a security level of the memory allocation from a plurality of security levels, the plurality of security levels having varying overhead between security levels.

19. The method as in claim 17, further comprising releasing a memory allocation in the address range of the first address space into the memory pool in the second address space.

20. The method as in claim 19, further comprising changing the relationship between an encoder and a range of abstracted memory after the relationship is assigned.

21. A non-transitory computer-readable medium with instructions stored therein, the instructions, when executed by a processor, cause the processor to perform operations, the operations comprising:
- determining a first address of a program data object in a first virtual memory address space;
- encoding the first address of the program data object to determine a second address of the program data object in a virtual second memory address space;
- dynamically changing the relationship between the layout of the data object in the first virtual memory address space with the layout of the object in the second virtual memory address space after encoding the first address of the program data to determine the second address of the program data object; and
- accessing the program object in the second virtual memory address space using the first virtual memory address, wherein the program data object is arranged linearly in the first virtual memory address space and non-linearly in the virtual memory second address space, and wherein the layout of the program data object in the first virtual memory address space is concealed from external analysis.

22. The computer readable medium as in claim 21, wherein the relationship between the layout of the program data object in the first address space and the layout of the program data object in the second address space is deterministically chaotic.

23. The computer readable medium as in claim 21 further comprising automatically encrypting data during a memory write and automatically decrypting data during a memory read.

24. The computer readable medium as in claim 21, further comprising providing a memory allocation in an address range of the first address space from a memory pool in the second address space.

25. The computer readable medium as in claim 24, further comprising providing a selectable security level, to select the security level of the memory allocation from a plurality of security levels, the security levels having varying overhead between security levels.

26. The computer readable medium as in claim 24, further comprising providing a de-allocator, to release a memory allocation in the first address space into the memory pool in the second address space.

27. The computer readable medium as in claim 24, further comprising providing a refresher, to change the relationship between an encoder and a range of abstracted memory after the relationship is assigned.

* * * * *